United States Patent
Chen et al.

(10) Patent No.: US 10,218,415 B2
(45) Date of Patent: Feb. 26, 2019

(54) ANTENNA SYSTEM AND WIRELESS ACCESS POINT

(71) Applicant: Wistron NeWeb Corp., Hsinchu (TW)

(72) Inventors: Chung-Yen Chen, Hsinchu (TW); Yu Tao, Hsinchu (TW); Yu-Chi Liu, Hsinchu (TW)

(73) Assignee: WISTRON NEWEB CORP., Hsinchu (TW)

( * ) Notice: Subject to any disclaimer, the term of this patent is extended or adjusted under 35 U.S.C. 154(b) by 0 days.

(21) Appl. No.: 15/685,444

(22) Filed: Aug. 24, 2017

(65) Prior Publication Data

US 2018/0269936 A1    Sep. 20, 2018

Related U.S. Application Data

(60) Provisional application No. 62/472,541, filed on Mar. 16, 2017.

(51) Int. Cl.
*H04B 7/0426* (2017.01)
*H04W 84/12* (2009.01)
*H04Q 3/40* (2006.01)

(52) U.S. Cl.
CPC ............ *H04B 7/0447* (2013.01); *H04Q 3/40* (2013.01); *H04W 84/12* (2013.01)

(58) Field of Classification Search
CPC ............................... H04B 7/0447; H04Q 3/40
USPC ........................................................ 343/853
See application file for complete search history.

(56) References Cited

U.S. PATENT DOCUMENTS

| | | | | |
|---|---|---|---|---|
| 4,943,811 A * | 7/1990 | Alden | ............... | H01Q 1/248 343/814 |
| 6,407,717 B2 * | 6/2002 | Killen | ............... | H01Q 9/285 343/795 |
| 9,780,456 B2 * | 10/2017 | Tao | ............... | H01Q 9/065 |

* cited by examiner

*Primary Examiner* — Peguy Jean Pierre

(57) ABSTRACT

An antenna system includes a first transmission line, a second transmission line, a third transmission line, a fourth transmission line, a first dipole antenna, a second dipole antenna, a third dipole antenna, a fourth dipole antenna, a fifth dipole antenna, a sixth dipole antenna, a seventh dipole antenna, and an eighth dipole antenna. Each dipole antenna is coupled through a corresponding transmission line to a feeding point. Each of the fifth dipole antenna, the sixth dipole antenna, the seventh dipole antenna, and the eighth dipole antenna is positioned between the feeding point and a corresponding one of the first dipole antenna, the second dipole antenna, the third dipole antenna, and the fourth dipole antenna. Each of the partial dipole antennas includes a positive radiation branch and a negative radiation branch. The angle between the positive radiation branch and the negative radiation branch is less than 100 degrees.

20 Claims, 10 Drawing Sheets

ANTENNA SYSTEM AND WIRELESS ACCESS POINT

CROSS REFERENCE TO RELATED APPLICATIONS

This application claims the benefit of U.S. Provisional Application No. 62/472,541, filed on Mar. 16, 2017, the entirety of which is incorporated by reference herein.

BACKGROUND OF THE INVENTION

Field of the Invention

The disclosure generally relates to an antenna system, and more particularly, to a small-size, omnidirectional antenna system.

Description of the Related Art

With the advancements being made in mobile communication technology, mobile devices such as portable computers, mobile phones, multimedia players, and other hybrid functional portable electronic devices have become more common. To satisfy consumer demand, mobile devices can usually perform wireless communication functions. Some devices cover a large wireless communication area; these include mobile phones using 2G, 3G, and LTE (Long Term Evolution) systems and using frequency bands of 700 MHz, 850 MHz, 900 MHz, 1800 MHz, 1900 MHz, 2100 MHz, 2300 MHz, and 2500 MHz. Some devices cover a small wireless communication area; these include mobile phones using Wi-Fi and Bluetooth systems and using frequency bands of 2.4 GHz, 5.2 GHz, and 5.8 GHz.

Wireless access points are indispensable elements for mobile devices in a room to connect to the Internet at a high speed. However, since the indoor environment has serious signal reflection and multipath fading, wireless access points should process signals from a variety of transmission directions simultaneously. Accordingly, it has become a critical challenge for antenna designers to design a small-size, omnidirectional antenna system in the limited space of a wireless access point.

BRIEF SUMMARY OF THE INVENTION

In an exemplary embodiment, the disclosure is directed to an antenna system including a first transmission line, a second transmission line, a third transmission line, a fourth transmission line, a first dipole antenna, a second dipole antenna, a third dipole antenna, a fourth dipole antenna, a fifth dipole antenna, a sixth dipole antenna, a seventh dipole antenna, and an eighth dipole antenna. The first dipole antenna is coupled through the first transmission line to a feeding point. The second dipole antenna is coupled through the second transmission line to the feeding point. The third dipole antenna is coupled through the third transmission line to the feeding point. The fourth dipole antenna is coupled through the fourth transmission line to the feeding point. The fifth dipole antenna is coupled to the first transmission line, and is positioned between the first dipole antenna and the feeding point. The sixth dipole antenna is coupled to the second transmission line, and is positioned between the second dipole antenna and the feeding point. The seventh dipole antenna is coupled to the third transmission line, and is positioned between the third dipole antenna and the feeding point. The eighth dipole antenna is coupled to the fourth transmission line, and is positioned between the fourth dipole antenna and the feeding point. Each of the first dipole antenna, the second dipole antenna, the third dipole antenna, and the fourth dipole antenna includes a positive radiation branch and a negative radiation branch. The angle between the positive radiation branch and the negative radiation branch is less than 100 degrees.

In another exemplary embodiment, the disclosure is directed to a wireless access point including a housing, a radio frequency circuit, and an antenna system as claimed above. The radio frequency circuit is disposed in the housing. The antenna system is electrically connected to the radio frequency circuit.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

In order to illustrate the purposes, features and advantages of the invention, the embodiments and figures of the invention are shown in detail as follows.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art can solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

Figure 1A:
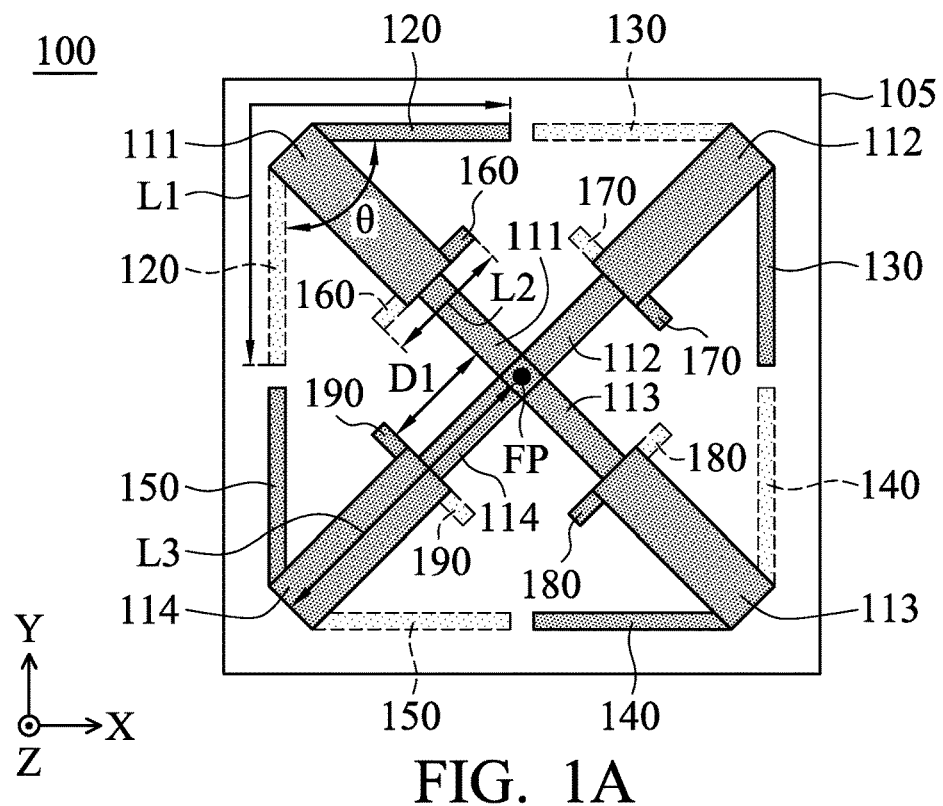
FIG. 1A is a diagram of an antenna system according to an embodiment of the invention.
Figure 1B:
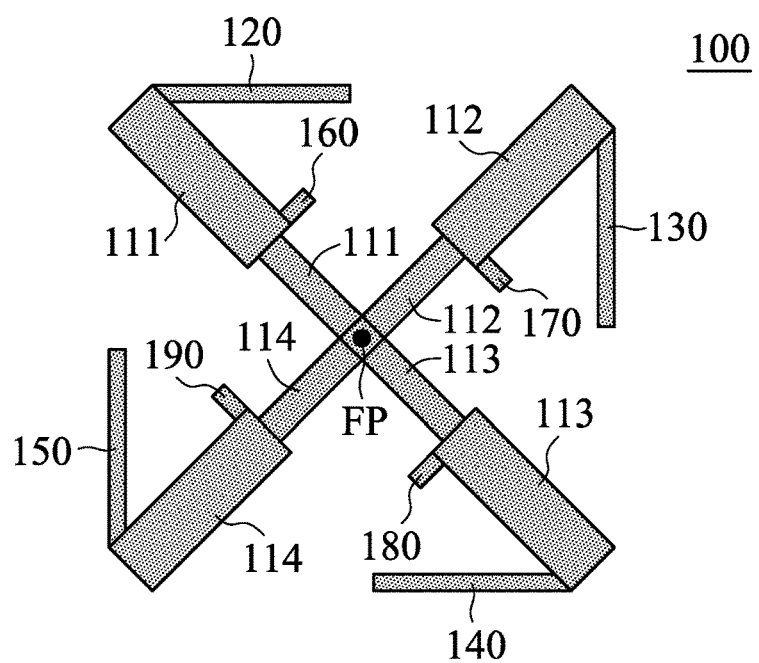
FIG. 1B is a diagram of an upper layer of an antenna system according to an embodiment of the invention.
Figure 1C:
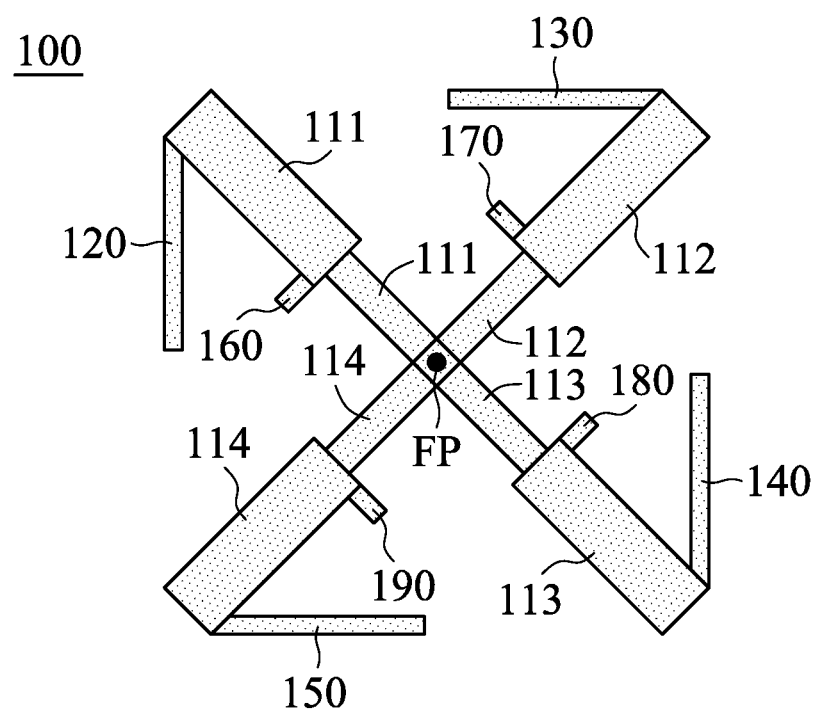
FIG. 1C is a diagram of a lower layer of an antenna system according to an embodiment of the invention.

FIG. 1A is a diagram of an antenna system 100 according to an embodiment of the invention. The antenna system 100 can be formed on an upper layer and a lower layer of a dielectric substrate 105. The dielectric substrate 105 may be a printed circuit board (PCB) or a flame retardant 4 (FR4) substrate. FIG. 1B is a diagram of an upper layer of the antenna system 100 according to an embodiment of the invention, that is, a partial antenna pattern disposed on the upper layer of the dielectric substrate 105 is displayed. FIG. 1C is a diagram of a lower layer of the antenna system 100 according to an embodiment of the invention, that is, another partial antenna pattern disposed on the lower layer of the dielectric substrate 105 is displayed. FIG. 1A is a combination of FIG. 1B and FIG. 1C. It should be noted that FIG. 1B is a top view of FIG. 1A, but FIG. 1C is a see-through view of the lower layer of the antenna pattern, instead of the back view of FIG. 1C (the difference between the see-through view and the back view is a 180-degree flip therebetween). Please refer to FIG. 1A, FIG. 1B, and FIG. 1C together. The antenna system 100 may be applied to a wireless access point. In the embodiment of FIG. 1A, FIG. 1B, and FIG. 1C, the antenna system 100 includes a first transmission line 111, a second transmission line 112, a third transmission line 113, a fourth transmission line 114, a first dipole antenna 120, a second dipole antenna 130, a third dipole antenna 140, a fourth dipole antenna 150, a fifth dipole antenna 160, a sixth dipole antenna 170, a seventh dipole antenna 180, and an eighth dipole antenna 190. Each dipole antenna includes a radiator disposed on the upper layer of the dielectric substrate 105, and another radiator disposed on the lower layer of the dielectric substrate 105. Each transmission line includes transmission paths disposed at the corresponding positions on the upper layer and the lower layer of the dielectric substrate 105. Each of the radiators on the upper layer and the lower layer is positioned at an end of the corresponding transmission line. Each two corresponding radiators respectively disposed on the upper layer and the lower layer extend toward different directions.

The antenna system 100 has a feeding point FP, which may be coupled to a radio frequency (RF) module (not shown). The RF module is configured to excite the antenna system 100. The first transmission line 111, the second transmission line 112, the third transmission line 113, the fourth transmission line 114, the first dipole antenna 120, the second dipole antenna 130, the third dipole antenna 140, the fourth dipole antenna 150, the fifth dipole antenna 160, the sixth dipole antenna 170, the seventh dipole antenna 180, and the eighth dipole antenna 190 are symmetrical with respect to the central feeding point FP. More specifically, the first transmission line 111, the first dipole antenna 120, and the fifth dipole antenna 160 can be grouped as a first communication unit; the second transmission line 112, the second dipole antenna 130, and the sixth dipole antenna 170 can be grouped as a second communication unit; the third transmission line 113, the third dipole antenna 140, and the seventh dipole antenna 180 can be grouped as a third communication unit; and the fourth transmission line 114, the fourth dipole antenna 150, and the eighth dipole antenna 190 can be grouped as a fourth communication unit. The four communication units may have the same structure, but arranged toward different directions in order to receive or transmit signals more omnidirectional. In other embodiments, the antenna system 100 may include fewer or more communication units depending on the user demands.

Any adjacent two (e.g., the second transmission line 112 and the third transmission line 113, or the first transmission line 111 and the fourth transmission line 114) of the first transmission line 111, the second transmission line 112, the third transmission line 113, and the fourth transmission line 114 may be substantially perpendicular to each other. Accordingly, an arrangement of the first transmission line 111, the second transmission line 112, the third transmission line 113, and the fourth transmission line 114 may substantially have a cross-shape. The first dipole antenna 120 is coupled through the first transmission line 111 to the feeding point FP. The second dipole antenna 130 is coupled through the second transmission line 112 to the feeding point FP. The third dipole antenna 140 is coupled through the third transmission line 113 to the feeding point FP. The fourth dipole antenna 150 is coupled through the fourth transmission line 114 to the feeding point FP. In order to fine-tune the impedance matching, each of the aforementioned transmission lines may have an unequal-width structure. For example, each transmission line may include a wider portion and a narrower portion, where each of the wider portions may be directly connected to the corresponding dipole antenna, and each of the narrower portions may be directly connected to the feeding point FP. In alternative embodiments, oppositely, each of the narrower portions can be directly connected to the corresponding dipole antenna, and each of the wider portions can be directly connected to the feeding point FP. In other embodiments, adjustments are made such that each of the aforementioned transmission lines has an equal-width structure.

Specifically, each of the first dipole antenna 120, the second dipole antenna 130, the third dipole antenna 140, and the fourth dipole antenna 150 includes a positive radiation branch and a negative radiation branch, which are respectively disposed on the upper layer and the lower layer of the dielectric substrate 105. The angle θ between the positive radiation branch and the negative radiation branch is less than 100 degrees. In some embodiments, the angle θ between the positive radiation branch and the negative radiation branch is substantially equal to 90 degrees, such that the arrangement of the first dipole antenna 120, the second dipole antenna 130, the third dipole antenna 140, and the fourth dipole antenna 150 substantially form a first square shape. The first transmission line 111, the second transmission line 112, the third transmission line 113, the fourth transmission line 114, the fifth dipole antenna 160, the sixth dipole antenna 170, the seventh dipole antenna 180, and the eighth dipole antenna 190 are surrounded by the first square shape.

The fifth dipole antenna 160 is coupled to the first transmission line 111, and is positioned between the first dipole antenna 120 and the feeding point FP. The sixth dipole antenna 170 is coupled to the second transmission line 112, and is positioned between the second dipole antenna 130 and the feeding point FP. The seventh dipole antenna 180 is coupled to the third transmission line 113, and is positioned between the third dipole antenna 140 and the feeding point FP. The eighth dipole antenna 190 is coupled to the fourth transmission line 114, and is positioned between the fourth dipole antenna 150 and the feeding point FP. Each of the fifth dipole antenna 160, the sixth dipole antenna 170, the seventh dipole antenna 180, and the eighth dipole antenna 190 is coupled to a central portion of each of the corresponding first transmission line 111, second transmission line 112, third transmission line 113, and fourth transmission line 114. The aforementioned central portion of each transmission line is at a junction between its wider portion and narrower portion.

Moreover, each of the fifth dipole antenna 160, the sixth dipole antenna 170, the seventh dipole antenna 180, and the eighth dipole antenna 190 includes two radiators respectively disposed on the upper layer and the lower layer, namely a positive radiation segment and a negative radiation segment, which are respectively disposed on the upper layer and the lower layer of the dielectric substrate 105. In some embodiments, the positive radiation segment and the negative radiation segment are substantially parallel to each other, or even linearly arranged, and they substantially extend toward opposite directions, such that the arrangement of the fifth dipole antenna 160, the sixth dipole antenna 170, the seventh dipole antenna 180, and the eighth dipole antenna 190 substantially form a second square shape. The area of the second square shape is smaller than the area of the first square shape formed by the first dipole antenna 120, the second dipole antenna 130, the third dipole antenna 140, and the fourth dipole antenna 150. The second square shape is located within the first square shape. The feeding point FP can be positioned at a central point of the second square shape, the first square shape, or both of the above.

In addition, each of the first dipole antenna 120, the second dipole antenna 130, the third dipole antenna 140, and the fourth dipole antenna 150 covers a low-frequency band, whereas each of the fifth dipole antenna 160, the sixth dipole antenna 170, the seventh dipole antenna 180, and the eighth dipole antenna 190 covers a high-frequency band. For example, the low-frequency band may be from about 2400 MHz to about 2500 MHz, and the high-frequency band may be from about 5150 MHz to about 5850 MHz.

It is worth noting that the entire size of the antenna system 100 can be greatly miniaturized comparing with conventional Alford loop antennas because of the appropriately designed and bent branches of each dipole antenna of the antenna system 100. Additionally, the entire area of the proposed antenna system 100 is about 30% to 40% smaller than the conventional ones without affecting its performance, including the operating frequency bands, radiation efficiency, and so on. Therefore, the antenna system 100 of the invention has the advantages of small-size, wide-bandwidth, and omnidirectional characteristics.

Figure 2A:
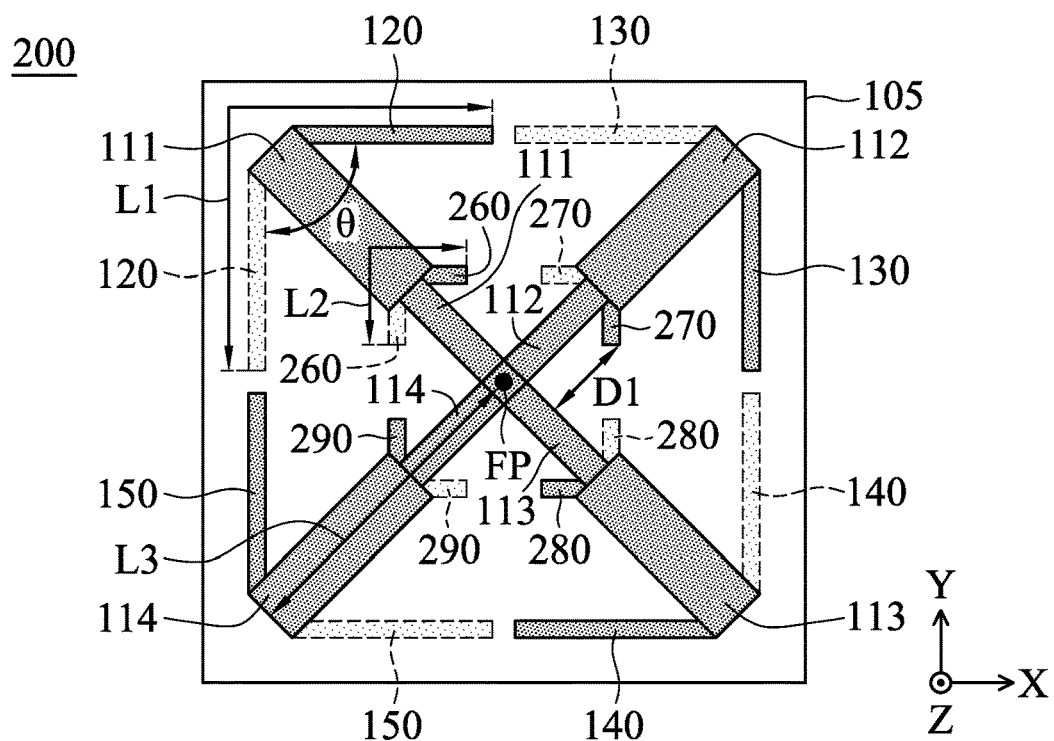
FIG. 2A is a diagram of an antenna system according to an embodiment of the invention.
Figure 2B:
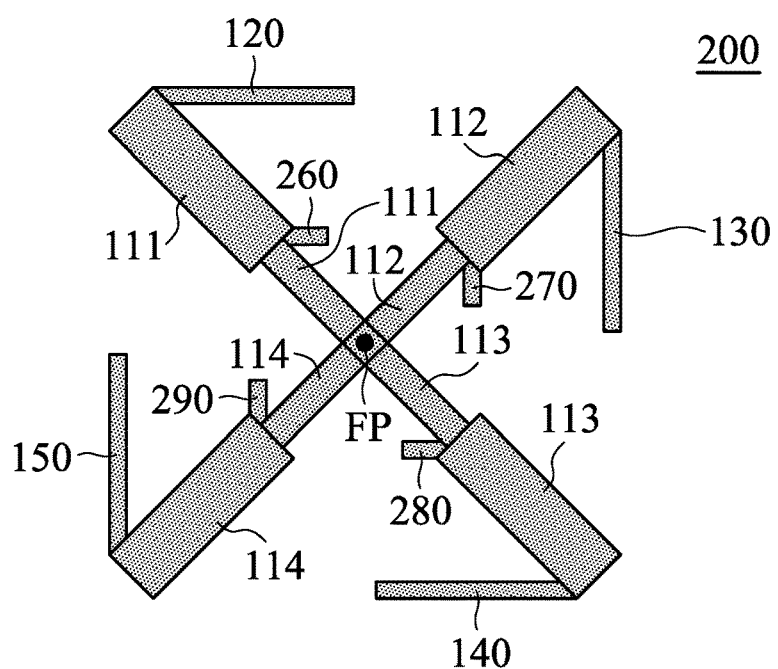
FIG. 2B is a diagram of an upper layer of an antenna system according to an embodiment of the invention.
Figure 2C:
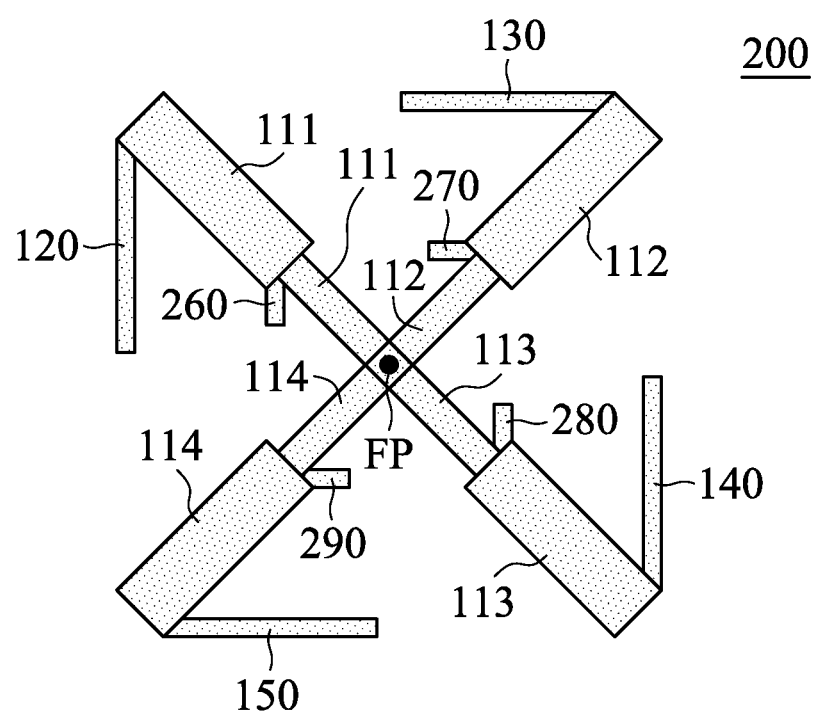
FIG. 2C is a diagram of a lower layer of an antenna system according to an embodiment of the invention.

FIG. 2A is a diagram of an antenna system 200 according to an embodiment of the invention. FIG. 2B is a diagram of an upper layer of the antenna system 200 according to an embodiment of the invention. FIG. 2C is a diagram of a lower layer of the antenna system 200 according to an embodiment of the invention. FIG. 2A, FIG. 2B, and FIG. 2C are similar to FIG. 1A, FIG. 1B, and FIG. 1C. In the embodiment of FIG. 2A, FIG. 2B, and FIG. 2C, a fifth dipole antenna 260, a sixth dipole antenna 270, a seventh dipole antenna 280, and an eighth dipole antenna 290 of the antenna system 200 extend in different directions. Specifically, each of the fifth dipole antenna 260, the sixth dipole antenna 270, the seventh dipole antenna 280, and the eighth dipole antenna 290 includes a positive radiation segment and a negative radiation segment (respectively disposed on the upper layer and the lower layer of the dielectric substrate 105). The positive radiation segment and the negative radiation segment are substantially perpendicular to each other, and they substantially extend away from the corresponding transmission line, such that the arrangement of the fifth dipole antenna 260, the sixth dipole antenna 270, the seventh dipole antenna 280, and the eighth dipole antenna 290 substantially form a third square shape. Note that the word "third" in the term "third square shape" does not mean that it has to be existing with a first and second square shape, the word "third" is merely used to distinguish from the "second square shape" of the previously introduced embodiment. The area of the third square shape is smaller than the area of the first square shape formed by the first dipole antenna 120, the second dipole antenna 130, the third dipole antenna 140, and the fourth dipole antenna 150. The third square shape is located within the first square shape. The feeding point FP can be positioned at a central point of the third square shape, the first square shape, or both of the above. The arrangement of the fifth dipole antenna 260, the sixth dipole antenna 270, the seventh dipole antenna 280, and the eighth dipole antenna 290 is configured to fine-tune the polarization direction of the antenna system 200 operating in the high-frequency band, without expanding the entire size of the antenna system 200. Other features of the antenna system 200 of FIG. 2A, FIG. 2B, and FIG. 2C are similar to those of the antenna system 100 of FIG. 1A, FIG. 1B, and FIG. 1C. Accordingly, the two embodiments can achieve similar levels of performance.

Figure 3A:
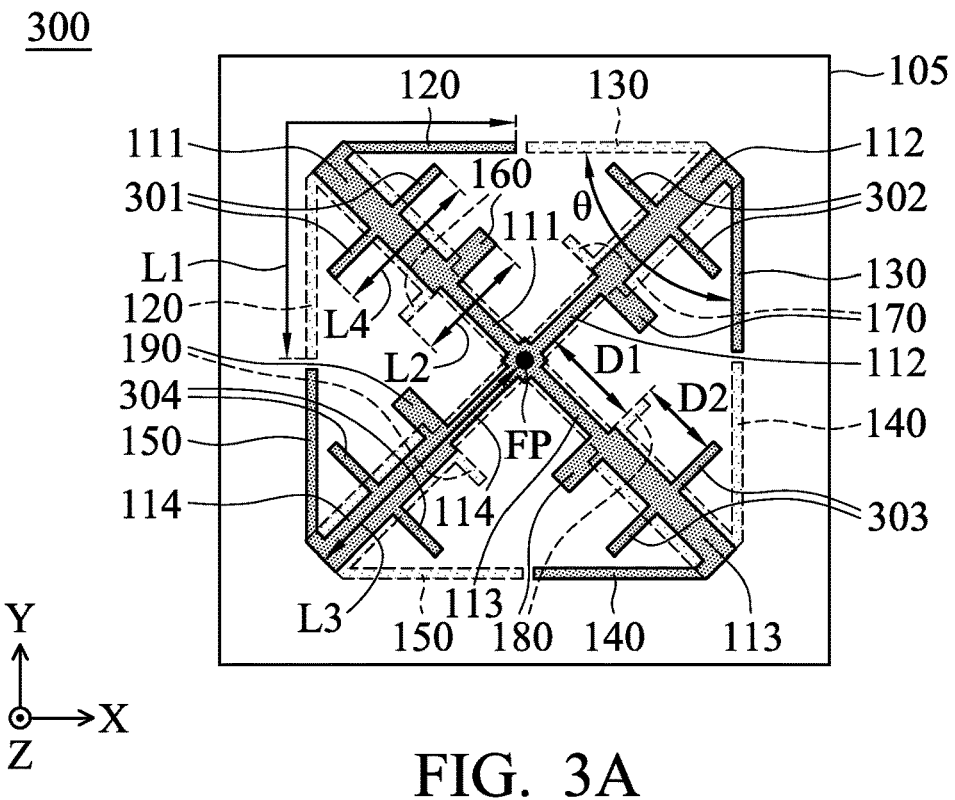
FIG. 3A is a diagram of an antenna system according to an embodiment of the invention.
Figure 3B:
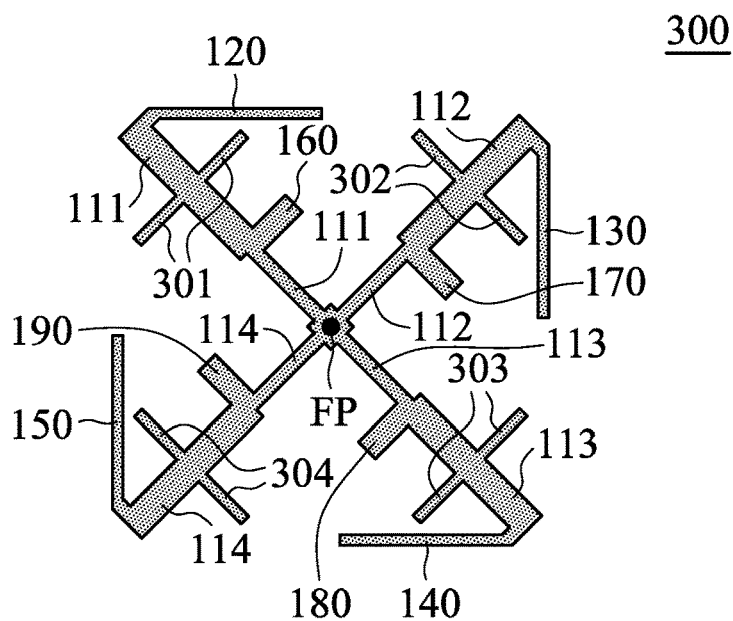
FIG. 3B is a diagram of an upper layer of an antenna system according to an embodiment of the invention.
Figure 3C:
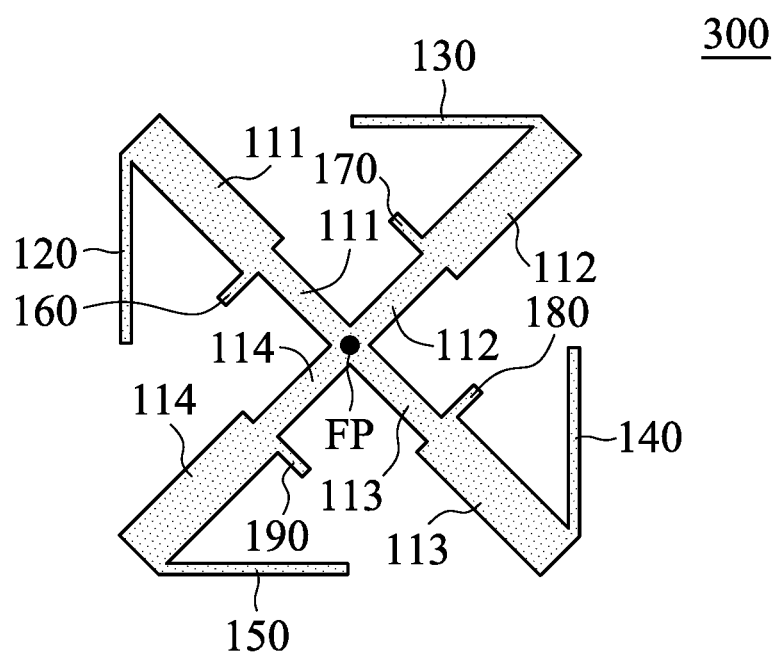
FIG. 3C is a diagram of a lower layer of an antenna system according to an embodiment of the invention.

FIG. 3A is a diagram of an antenna system 300 according to an embodiment of the invention. FIG. 3B is a diagram of an upper layer of the antenna system 300 according to an embodiment of the invention. FIG. 3C is a diagram of a lower layer of the antenna system 300 according to an embodiment of the invention. FIG. 3A, FIG. 3B, and FIG. 3C are similar to FIG. 1A, FIG. 1B, and FIG. 1C. In the embodiment of FIG. 3A, FIG. 3B, and FIG. 3C, the antenna system 300 further includes a first director 301, a second director 302, a third director 303, and a fourth director 304. The first director 301 is coupled to the first transmission line 111, and is positioned between the first dipole antenna 120 and the fifth dipole antenna 160. The second director 302 is coupled to the second transmission line 112, and is positioned between the second dipole antenna 130 and the sixth dipole antenna 170. The third director 303 is coupled to the third transmission line 113, and is positioned between the third dipole antenna 140 and the seventh dipole antenna 180. The fourth director 304 is coupled to the fourth transmission line 114, and is positioned between the fourth dipole antenna 150 and the eighth dipole antenna 190. Specifically, each of the first director 301, the second director 302, the third director 303, and the fourth director 304 includes a positive extension branch and a negative extension branch (both disposed on the upper layer of the dielectric substrate 105, or both disposed on the lower layer of the dielectric substrate 105). The positive extension branch and the negative extension branch are substantially parallel to each other, or even linearly arranged, and they substantially extend toward opposite directions. Each of the first director 301, the second director 302, the third director 303, and the fourth director 304 may be substantially parallel to each of the corresponding fifth dipole antenna 160, sixth dipole antenna 170, seventh dipole antenna 180, and eighth dipole antenna 190. The first director 301, the second director 302, the third director 303, and the fourth director 304 are configured to guide the high-frequency radiation outwardly, so as to enhance the radiation pattern of the antenna system 300 operating in the high-frequency band, without expanding the total area of the antenna system 300. Other features of the antenna system 300 of FIG. 3A, FIG. 3B, and FIG. 3C are similar to those of the antenna system 100 of FIG. 1A, FIG. 1B, and FIG. 1C. Accordingly, the two embodiments can achieve similar levels of performance.

Figure 4:
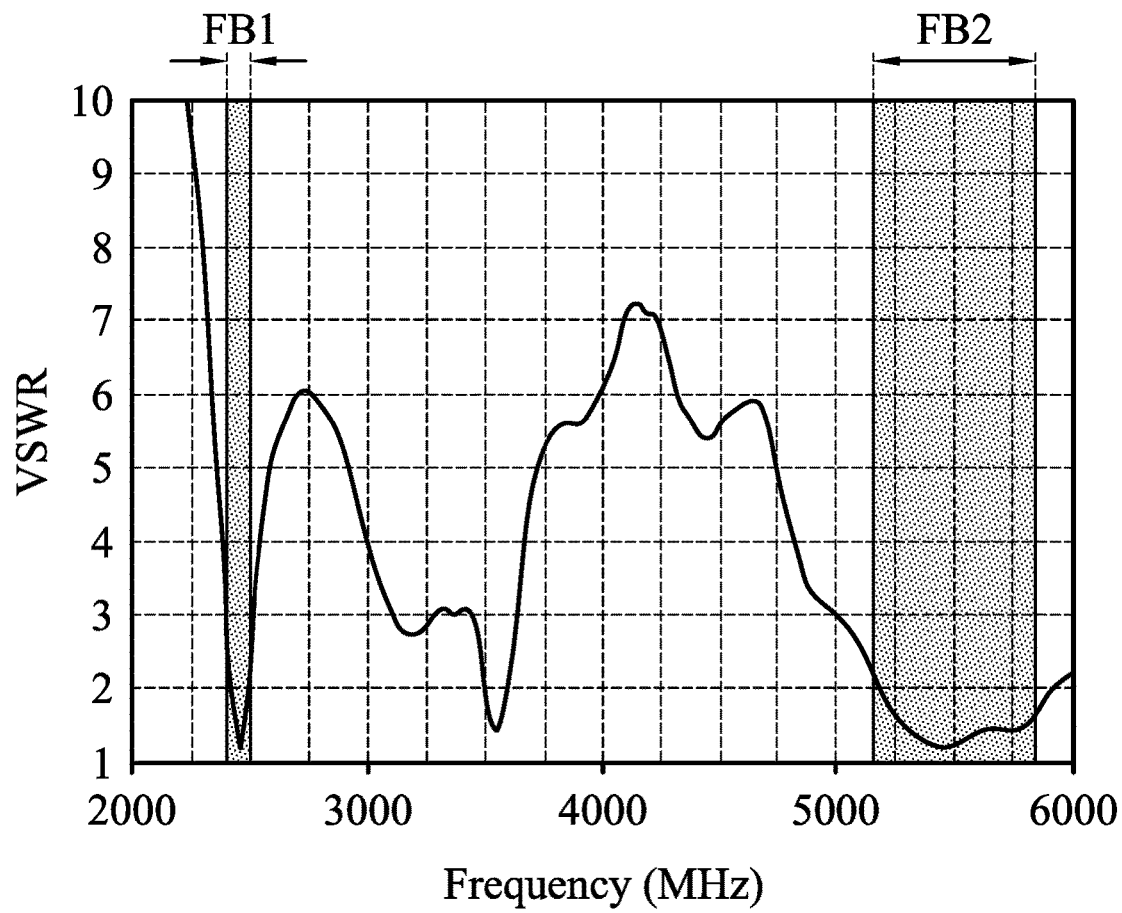
FIG. 4 is a diagram of voltage standing wave ratio (VSWR) of an antenna system according to an embodiment of the invention.

FIG. 4 is a diagram of voltage standing wave ratio (VSWR) of the antenna system 300 according to an embodiment of the invention, where the horizontal axis represents the operation frequency (MHz), and the vertical axis represents the VSWR. According to the measurement of FIG. 4, the antenna system 300 can at least cover a low-frequency band FB1 from about 2400 MHz to about 2500 MHz, and a high-frequency band FB2 from about 5150 MHz to about 5850 MHz. Therefore, the antenna system 300 can support at least the dual-band operation of wireless local area network (WLAN) 2.4 GHz/5 GHz.

Figure 5A:
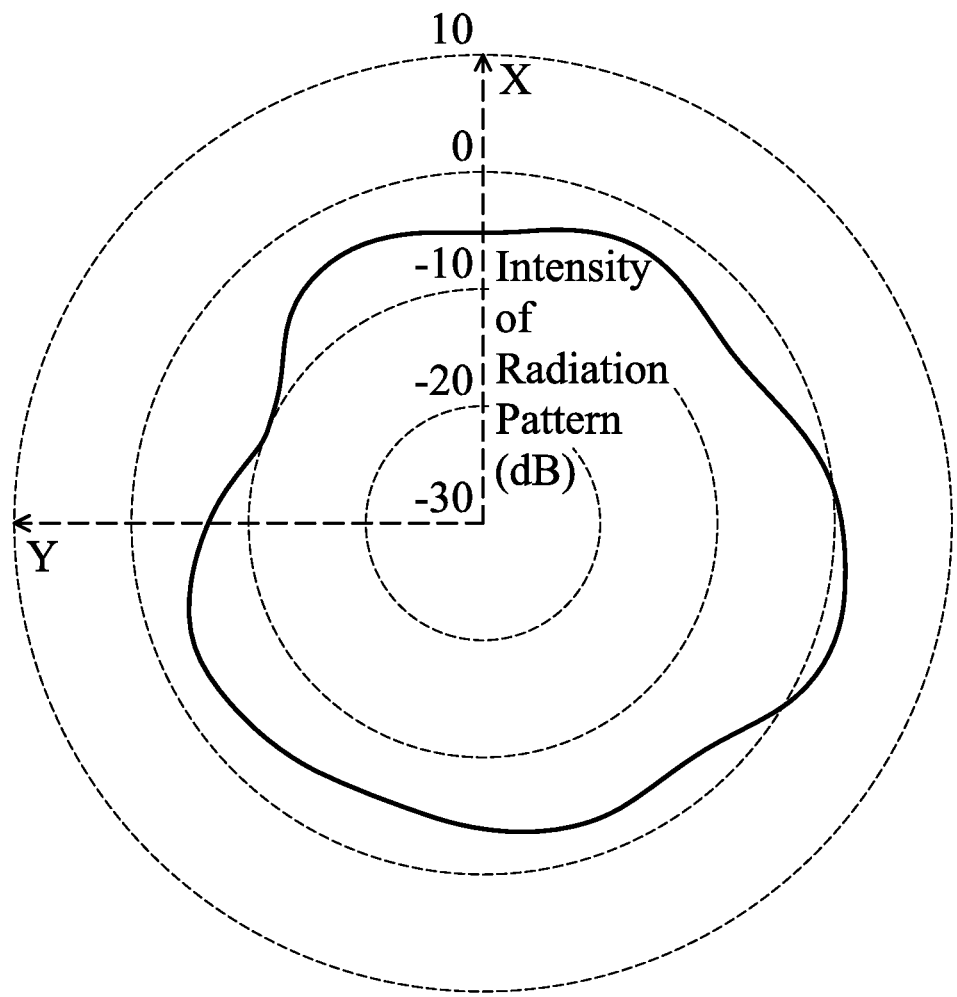
FIG. 5A is a radiation pattern of an antenna system operating in a low-frequency band according to an embodiment of the invention.
Figure 5B:
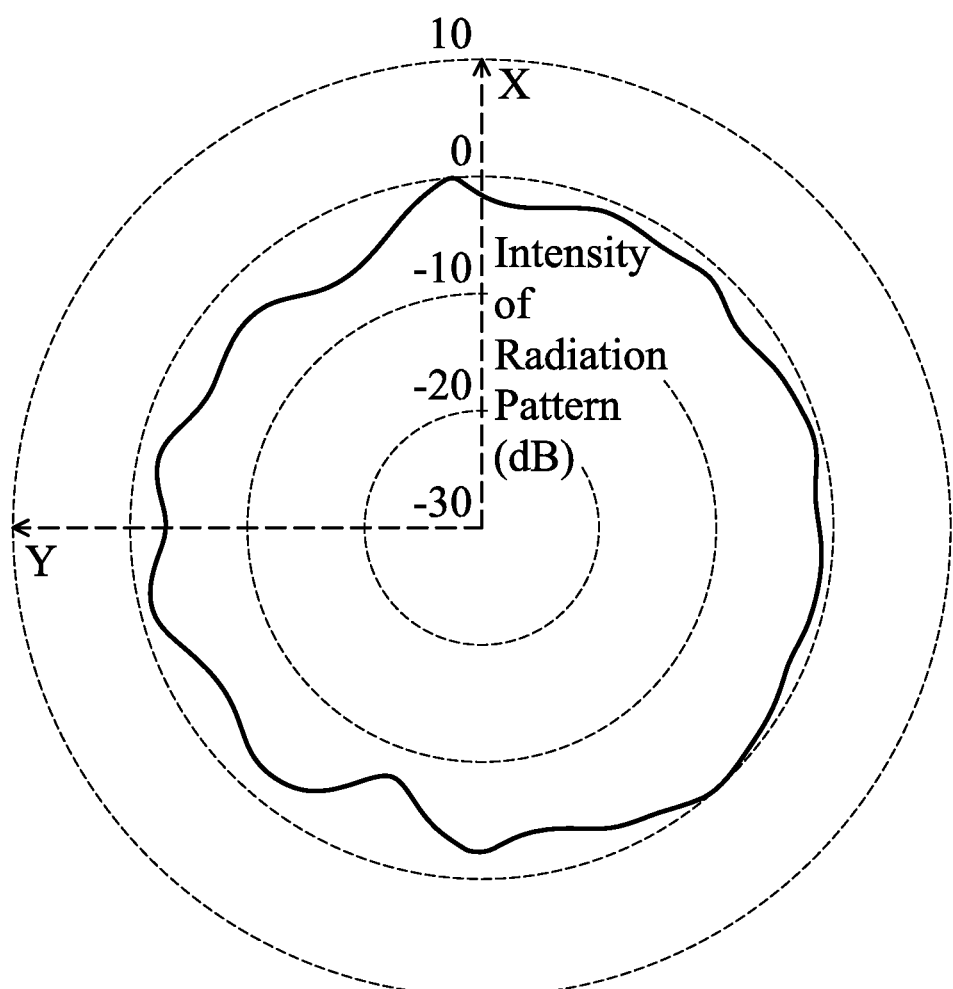
FIG. 5B is a radiation pattern of an antenna system operating in a high-frequency band according to an embodiment of the invention.

FIG. 5A is a radiation pattern of the antenna system 300 operating in the low-frequency band FB1 according to an embodiment of the invention, which is measured along the XY plane. FIG. 5B is a radiation pattern of the antenna system 300 operating in the high-frequency band FB2 according to an embodiment of the invention, which is measured along the XY plane. According to the measurement of FIG. 5A and FIG. 5B, the antenna system 300 is considered as an improved Alford loop antenna. With the miniaturized size, the antenna system 300 can still generate an almost omnidirectional radiation pattern in the desired high/low-frequency band, so as to meet the requirements for practical applications.

In some embodiments, the total length L1 of each of the first dipole antenna 120, the second dipole antenna 130, the third dipole antenna 140, and the fourth dipole antenna 150 is substantially equal to 0.5 wavelength ($\lambda/2$) of the low-frequency band FB1. The total length L2 of each of the fifth dipole antenna 160 (or 260), the seventh dipole antenna 170 (or 270), the seventh dipole antenna 180 (or 280), and the eighth dipole antenna 190 (or 290) is substantially equal to 0.5 wavelength ($\lambda/2$) of the high-frequency band FB2. In some embodiments, the element sizes of the antenna systems 100, 200, and 300 are estimated according to the following equations (1) to (6).

$$A = \frac{300}{\sqrt{2} \cdot \alpha \cdot \sqrt{C+1}} \quad (1)$$

$$B = \frac{300}{\sqrt{2} \cdot \beta \cdot \sqrt{C+1}} \quad (2)$$

where the parameters "A" and "B" are in units of millimeters (mm), the central frequency of the low-frequency band FB1 is set to "$\alpha$" GHz, the central frequency of the high-frequency band FB2 is set to "$\beta$" GHz, and the dielectric constant of the dielectric substrate 105 is set to "C".

$$0.6 \cdot A < L1 < 1.4 \cdot A \quad (3)$$

where "L1" represents the total length of each of the first dipole antenna 120, the second dipole antenna 130, the third dipole antenna 140, and the fourth dipole antenna 150.

$$0.6 \cdot B < L2 < 1.4 \cdot B \quad (4)$$

where "L2" represents the total length of each of the fifth dipole antenna 160 (or 260), the seventh dipole antenna 170 (or 270), the seventh dipole antenna 180 (or 280), and the eighth dipole antenna 190 (or 290).

$$0.3 \cdot A < L3 < 0.7 \cdot A \quad (5)$$

where "L3" represents the total length of the vertical projection of each of the first transmission line 111, the second transmission line 112, the third transmission line 113, and the fourth transmission line 114.

$$0.3 \cdot B < D1 < 0.7 \cdot B \quad (6)$$

where "D1" represents the distance between the feeding point FP and each of the fifth dipole antenna 160 (or 260), the sixth dipole antenna 170 (or 270), the seventh dipole antenna 180 (or 280), and the eighth dipole antenna 190 (or 290).

In some embodiments, the distance D2 from each of the first director 301, the second director 302, the third director 303, and the fourth director 304 to a corresponding one of the fifth dipole antenna 160, the seventh dipole antenna 170, the seventh dipole antenna 180, and the eighth dipole antenna 190 is substantially equal to the aforementioned distance D1, and its estimation method has been described in equation (6). In alternative embodiments, the total length L4 of each of the first director 301, the second director 302, the third director 303, and the fourth director 304 is substantially from 0.4 to 1.1 times the total length L2 of each of the fifth dipole antenna 160, the seventh dipole antenna 170, the seventh dipole antenna 180, and the eighth dipole antenna 190 (i.e. $0.4 \cdot L2 < L4 < 1.1 \cdot L2$), and its estimation method has been described in equation (4). It should be noted that the element size ranges estimated by equations (1) to (6) are determined according to a lot of experiment results, and they are arranged for optimizing the operation band and impedance matching of the antenna systems 100, 200, and 300.

Figure 6:
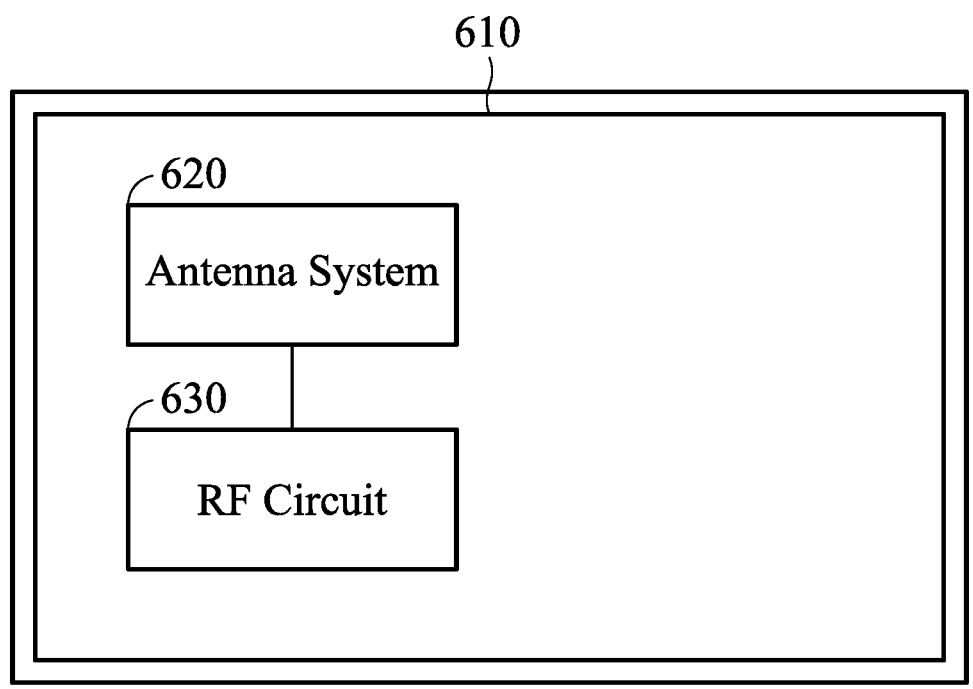
FIG. 6 is a diagram of a wireless access point according to an embodiment of the invention.

FIG. 6 is a diagram of a wireless access point 600 according to an embodiment of the invention. In the embodiment of FIG. 6, the wireless access point 600 includes a housing 610, an antenna system 620, and an RF circuit 630. The housing 610 may be a hollow structure of any shape. The antenna system 620 and the RF circuit 630 may be disposed in the housing 610. The antenna system 620 is electrically connected to the RF circuit 630. It should be noted that the antenna system 620 is any one selected among the aforementioned antenna systems 100, 200, and 300. The function and structure of the antenna system 620 have been described in the above embodiments.

The invention proposes a novel antenna system. In comparison to the conventional design, the invention has at least the advantages of: (1) covering a wider frequency band, (2) providing an almost omnidirectional radiation pattern, (3) effectively reducing the total antenna size, (4) increasing the antenna radiation efficiency, (5) having a simple structure to be easily manufactured, and (6) reducing the total manufacturing cost. Therefore, the invention is suitable for application in a variety of multiband communication devices or wireless access points.

Note that the above element sizes, element shapes, and frequency ranges are not limitations of the invention. An antenna designer can fine-tune these settings or values according to different requirements. It should be understood that the antenna system and wireless access point of the invention are not limited to the configurations of FIGS. 1-5. The invention may merely include any one or more features of any one or more embodiments of FIGS. 1-5. In other words, not all of the features displayed in the figures should be implemented in the antenna system and wireless access point of the invention.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An antenna system, comprising:
a first transmission line;
a second transmission line;
a third transmission line;
a fourth transmission line;
a first dipole antenna, coupled through the first transmission line to a feeding point;
a second dipole antenna, coupled through the second transmission line to the feeding point;
a third dipole antenna, coupled through the third transmission line to the feeding point;
a fourth dipole antenna, coupled through the fourth transmission line to the feeding point;
a fifth dipole antenna, coupled to the first transmission line, and positioned between the first dipole antenna and the feeding point;
a sixth dipole antenna, coupled to the second transmission line, and positioned between the second dipole antenna and the feeding point;
a seventh dipole antenna, coupled to the third transmission line, and positioned between the third dipole antenna and the feeding point; and
an eighth dipole antenna, coupled to the fourth transmission line, and positioned between the fourth dipole antenna and the feeding point;
wherein each of the first dipole antenna, the second dipole antenna, the third dipole antenna, and the fourth dipole antenna comprises a positive radiation branch and a negative radiation branch, and wherein an angle between the positive radiation branch and the negative radiation branch is less than 100 degrees.

2. The antenna system as claimed in claim 1, wherein the angle between the positive radiation branch and the negative radiation branch is substantially equal to 90 degrees.

3. The antenna system as claimed in claim 1, wherein the arrangement of the first dipole antenna, the second dipole antenna, the third dipole antenna, and the fourth dipole antenna substantially forms a first square shape.

4. The antenna system as claimed in claim 3, wherein the first transmission line, the second transmission line, the third transmission line, the fourth transmission line, the fifth dipole antenna, the sixth dipole antenna, the seventh dipole antenna, and the eighth dipole antenna are located within the first square shape.

5. The antenna system as claimed in claim 4, wherein the arrangement of the fifth dipole antenna, the sixth dipole antenna, the seventh dipole antenna, and the eighth dipole antenna substantially forms a second square shape, and the area of the second square shape is smaller than the area of the first square shape.

6. The antenna system as claimed in claim 1, wherein any adjacent two of the first transmission line, the second transmission line, the third transmission line, and the fourth transmission line are substantially perpendicular to each other.

7. The antenna system as claimed in claim 1, wherein the arrangement of the first transmission line, the second transmission line, the third transmission line, and the fourth transmission line substantially forms a cross-shape.

8. The antenna system as claimed in claim 1, wherein each of the fifth dipole antenna, the sixth dipole antenna, the seventh dipole antenna, and the eighth dipole antenna comprises a positive radiation segment and a negative radiation segment, and wherein the positive radiation segment and the negative radiation segment are substantially parallel or perpendicular to each other.

9. The antenna system as claimed in claim 1, further comprising:
a first director, coupled to the first transmission line, and positioned between the first dipole antenna and the fifth dipole antenna;
a second director, coupled to the second transmission line, and positioned between the second dipole antenna and the sixth dipole antenna;
a third director, coupled to the third transmission line, and positioned between the third dipole antenna and the seventh dipole antenna; and
a fourth director, coupled to the fourth transmission line, and positioned between the fourth dipole antenna and the eighth dipole antenna.

10. The antenna system as claimed in claim 9, wherein each of the first director, the second director, the third director, and the fourth director comprises a positive extension branch and a negative extension branch, and wherein the positive extension branch and the negative extension branch substantially extend in opposite directions.

11. The antenna system as claimed in claim 1, wherein each of the first dipole antenna, the second dipole antenna, the third dipole antenna, and the fourth dipole antenna covers a low-frequency band, and each of the fifth dipole antenna, the sixth dipole antenna, the seventh dipole antenna, and the eighth dipole antenna covers a high-frequency band.

12. The antenna system as claimed in claim 11, wherein the low-frequency band is from about 2400 MHz to about 2500 MHz, and the high-frequency band is from about 5150 MHz to about 5850 MHz.

13. The antenna system as claimed in claim 11, wherein the antenna system is formed on an upper layer and a lower layer of a dielectric substrate.

14. The antenna system as claimed in claim 13, wherein a total length L1 of each of the first dipole antenna, the second dipole antenna, the third dipole antenna, and the fourth dipole antenna is within the following range:

$$0.6 \cdot A < L1 < 1.4 \cdot A$$

$$A = \frac{300}{\sqrt{2} \cdot \alpha \cdot \sqrt{C+1}}$$

where A is in units of millimeters (mm), a central frequency of the low-frequency band is $\alpha$ GHz, and C is a dielectric constant of the dielectric substrate.

15. The antenna system as claimed in claim 13, wherein a total length L2 of each of the fifth dipole antenna, the sixth dipole antenna, the seventh dipole antenna, and the eighth dipole antenna is within the following range:

$$0.6 \cdot B < L2 < 1.4 \cdot B$$

-continued $$B = \frac{300}{\sqrt{2} \cdot \beta \cdot \sqrt{C+1}}$$

where B is in units of millimeters (mm), a central frequency of the high-frequency band is β GHz, and C is a dielectric constant of the dielectric substrate.

16. The antenna system as claimed in claim 13, wherein a total length L3 of each of the first transmission line, the second transmission line, the third transmission line, and the fourth transmission line is within the following range:

$$0.3 \cdot A < L3 < 0.7 \cdot A$$

$$A = \frac{300}{\sqrt{2} \cdot \alpha \cdot \sqrt{C+1}}$$

where A is in units of millimeters (mm), a central frequency of the low-frequency band is α GHz, and C is a dielectric constant of the dielectric substrate.

17. The antenna system as claimed in claim 13, wherein a distance D1 between the feeding point and each of the fifth dipole antenna, the sixth dipole antenna, the seventh dipole antenna, and the eighth dipole antenna is within the following range:

$$0.3 \cdot B < D1 < 0.7 \cdot B$$

$$B = \frac{300}{\sqrt{2} \cdot \beta \cdot \sqrt{C+1}}$$

where B is in units of millimeters (mm), a central frequency of the high-frequency band is β GHz, and C is a dielectric constant of the dielectric substrate.

18. A wireless access point, comprising:
a housing;
a radio frequency circuit, disposed in the housing; and
an antenna system as claimed in claim 1, wherein the antenna system is electrically connected to the radio frequency circuit.

19. The wireless access point as claimed in claim 18, wherein the antenna system covers a low-frequency band from about 2400 MHz to about 2500 MHz, and a high-frequency band from about 5150 MHz to about 5850 MHz.

20. The wireless access point as claimed in claim 18, wherein the arrangement of the first dipole antenna, the second dipole antenna, the third dipole antenna, and the fourth dipole antenna of the antenna system substantially has a first square shape.

* * * * *